*W. H. Lindsay,*
*Steam-Boiler Water-Feeder,*
*N°6,130.    Patented Feb. 20, 1849.*
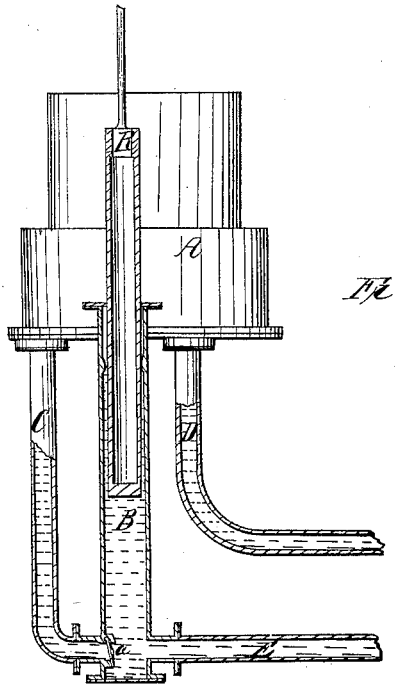
Fig: 1.
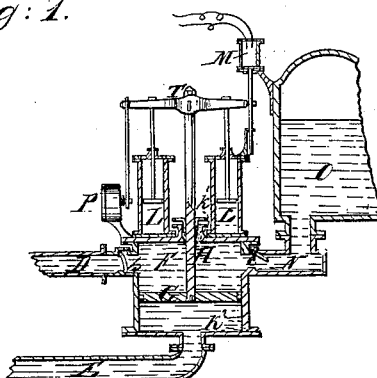
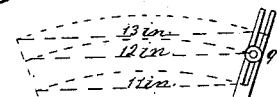
Fig: 2.    Fig: 3.    Fig: 4.
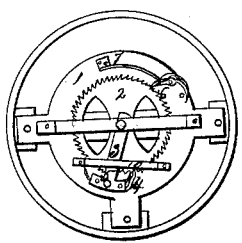
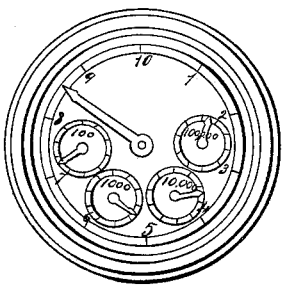

UNITED STATES PATENT OFFICE.

WILLIAM H. LINDSAY, OF NEW YORK, N. Y.

FLUID-METER.

Specification of Letters Patent No. 6,130, dated February 20, 1849.

*To all whom it may concern:*

Be it known that I, WILLIAM HENRY LINDSAY, of the city of New York, in the county of New York and State of New York, have invented a fluid meter for measuring or ascertaining the cubical or other quantity of a fluid that may pass or be forced by mechanical or other means through it in its passage from one or more vessels to others, which when used or applied in combination with the self-acting feed apparatus and an electromagnetic alarm in the manner herein described I term a feedometer; and to enable those skilled in the art to make and use my invention I do hereby declare that the following is a full and exact description of the said invention.

The object sought by the use of the fluid meter being the direct measurement, and registration by means of a counter, of the quantity of fluid, which has passed from one or more vessels into, and been discharged from a cylinder of any given diameter, and length, (the cubical capacity of which being known, which known quantity serves as an index, for the purpose of registration by means of the counter,) if the counter only registers in proportion to the quantity discharged from the cylinder by the rise of the piston, as for instance if the stroke of the piston is estimated as 12 inches, and the area of surface of the piston at 100 square inches, the cubic quantity contained in that space will be 1200 cubic inches, taking that, as a standard, a counter, " the construction of which is herein described but to which I do not lay any claim," the face of which can be read off to millions, the outer circle having a circumference of say 30 inches which is divided into ten spaces, numbered from 1 to 10 the distance between each being 3 inches, now taking the distance of 3 inches, equal to the distance of from point to point as registering a distance of 12 inches, traveled by the piston on its upward stroke by connecting the piston rod with the lever of the counter in such a manner as to communicate the motion of the piston during its ascent to the hand that revolves around the outer circle, the distance the hand revolves will be proportioned to the distance traveled by the piston, if the piston rose 3 inches, the hand would travel three quarters of an inch, it keeps all it gets, in other words the hand remains where it is carried to until the piston again rises, when it is again carried forward in proportion to the pistons stroke.

From the above explanation it will be evident, that from an inspection of the counter at any time, the quantity that has been delivered can be ascertained, by simply multiplying the number of cubic inches, due to each point, by their number.

Figure 1, in the drawings annexed, is a sectional elevation of the fluid meter attached to the chest of the self acting feed. Fig. 2, view of the counter, the cover being removed Fig. 3, front view of the counter without showing the moving lever, Fig. 4, back view of the counter, with the lever.

A is a hot well or tank. B, feed pump. C, feed pump supply pipe from the hot well. D, supply pipe from the hot well to the cylinder F. E, feed pipe from the feed pump to the cylinder F. F, meter cylinder. G, piston. H, piston rod. I, piston rod cross head. $K^1$ cylinder cover. $K^2$ cylinder seat. L, L, pneumatic cylinders, or pumps, fitted with pistons working air tight, the piston rods being attached to the cross head, I. M, small tube or cylinder provided with piston and rod, partly filled with mercury. N, fluid chamber. O, chest of the self acting feed. P, counter. R, feed pump plunger. 1, frame screwed to the lugs on the counter cover. 2, ratchet wheel. 3, lever carrying the pawls, or catches. 4, catches, for working the ratchet wheel. 5, pin on lever 3, attached on the outside to the lever, 8. 6, catches to prevent the return of the ratchet wheel. 7, springs to keep them down. 8, lever. 9, adjustable pin of lever 8. 10, guard to keep lever 3 steady. $a$, valve in the supply pipe C. $b$, valve in the supply pipe D. $c$, valve near the cylinder F, in the chamber N.

Having given reference by letters and figures to the several parts shown in the drawings, I will now proceed to describe the construction and operation of the fluid meter.

From the hot well A, and the feed pump B, communication is made with the cylinder F, by means of the supply pipe D, from the hot well to the upper part of the cylinder, and from the feed pump by the feed pipe E, to the cylinder, through the cylinder seat $K^2$, or through the side. I place the cylinder F, in a vertical position, but it may be placed horizontally, or in any other convenient manner, it makes no difference as to the manner it is placed, as long as the supply pipe D, communicates with one end, and the feed pipe E, with the other, in whatever position it is placed it should be if convenient at or about the level of the feed pipe, near the top of the cylinder, there is a port leading into the fluid chamber N, which forms the eduction passage, for the discharge of the fluid into the chest O, or other receptacle designed for its reception, at or near the mouth of the port, near the cylinder there is a valve $c$, allowing of the fluid between the piston, and the cylinder cover, passing into and through the fluid chamber, by reason of the rise of the piston G, forcing it out of the cylinder, but shutting and preventing the return of any that has passed the valve; on the piston G, ceasing to rise, or during its descent, there is also a valve $b$, in the supply pipe D, or it may be fitted in a recess cast on the cylinder, allowing of the water or other fluid flowing into the cylinder from the hot well during the descent of the piston G, but shutting and preventing its return, during the ascent of the piston, the piston is provided with a piston rod H, working through a stuffing box on the cylinder cover, $K^1$, and carries a cross head I, at equal distances from the center of which the piston rods of the two pneumatic pumps L, L, are attached, the pneumatic pumps are bolted to, or otherwise attached to the top of the cylinder cover; each pump barrel or chamber is fitted with a piston working air tight, and in order to form a guide for the piston rods, a cover minus a segment off on each side with a deep neck or stuffing box, may be bolted onto the flange around the top of the barrel, or if preferred a cover may be put on, with one or more as large holes through it as it will admit of, the object being to obtain a guide for the pump rods, which likewise answers the purpose of guide rods, or slides for the cross head I, and at the same time to admit of the free passage of the air to and from the pump barrels above the pistons, so that when the piston G, is forced up, carrying with it the cross head, and the pump rods, the pistons in the pneumatic pumps rise, leaving a vacuum beneath the pistons in the barrels. The atmospheric pressure, on the top of the pistons in the pneumatic pumps, aiding the descent of the piston G, on its downward or return stroke during the ascent of the plunger R, in the feed pump.

To the outer end of the cross head, one end of a light connecting rod, is attached working freely on a pivot or pin. The other end is attached to the crank or lever of the counter P, which can only register according to the actual distance traveled by the piston G, during its ascent or upward stroke. The other or inner end of the cross head as shown in the drawing, has a stud or projecting pin, which should the piston G, travel beyond its set stroke, in its ascent or upward stroke, either by reason of the pneumatic pumps failing to act, from leakage of air beneath the pistons, by any of the rods breaking, or from other causes, will come in contact with a stud or projection on the rod attached to the piston in the mercury tube M. In or through the side or cover of the tube two platinum wires are inserted, and extend into the tube a short distance from the cover. The outer ends of the platinum wires are connected with copper wires attached to an electric magnetic machine, with an alarm bell, in the tube mercury to the depth of 1 or 2 inches, rests on the piston, and when the piston in the tube is moved up by the pin on the cross head coming in contact with the projection or stud on the piston rod of the mercury tube, occasioned by the rise of the piston G, above or beyond its set stroke, the mercury immediately it is raised sufficiently high to touch or come in contact with the ends of the wires, completes the metallic communication, which causes an instant alarm to be given by the ringing of the alarm bell.

The supply pipe C, from the hot well to the feed pump is provided with a valve $a$, allowing of the fluid entering the feed pump from the hot well, but shutting and preventing its return into the pipe C. The overflow or waste pipe, with the loaded valve, as also the cock for shutting off the feed, if one is made use of, are on or connected with the feed pipe E, in the usual manner. I leave a space of from 3 to 4 inches, if the piston G, be from 2 to 3 inches in depth, above the upper side of the port, leading to the chamber N, in the cylinder F, as clearance, so as to allow of the piston G, to raise above the port, in case of the pneumatic pumps failing to act, the breaking of the rods, or other causes. By the piston G, moving above or beyond the edge of the port, in case of an accident of the kind the feed or supply forced into the cylinder by the feed pump will have a free passage through the cylinder and port into and through the fluid chamber N, into the chest O, or other receptacle designed to receive it, so that should an accident of the kind occur, the means are within itself to prevent any further damage by the choking of the meter, as also to give an alarm. Should the leakage of air beneath the pistons into the pneumatic pumps be, to so great an extent, as to materially interfere with their working properly, it can readily be expelled by either of the following methods. If connected with a condensing engine, connect a pipe provided with a stop cock, from the steam chest or the boiler to the lower end of the pump barrels or chambers, also connect a pipe provided with a stop cock to the condenser. When it is wished to expel the air collected in the pumps, between the piston and pump seat, open the cock in the pipe leading to the condenser, and blow through by letting the steam in, which will expel the air into the condenser, when the steam pipe cock may be shut, and the steam in the pump will then flow into the condenser, leaving a vacuum, when the cock in the pipe leading to the condenser is shut.

The other method is as follows: Let small pipes joined in a main, provided with a stop cock or a simple valve over the mouth of the main, will answer as well, be attached to the pumps, near the seat, and attach a pipe as large or larger than the main from the water space in the boiler, connecting near the top through the side, or if preferred through the cover $K^1$ of the cylinder F, the pipe to have a stop cock in it near where it enters the cylinder. Now if the feed pump plunger R, be raised, and the water from the boiler let in between the cover $K^1$ and the upper side of the piston G, the cock in the main being first opened, the pressure of steam in the boiler forcing the water into the cylinder, will carry the piston down, and the pistons in the pump barrels will expel the air through the pipes into and through the main in their descent. When the pistons have reached the end of their downward stroke, the cock in the main is to be shut. If the cylinder F, is placed vertically as shown in the drawings, the piston, rod, and cross head. may be made sufficiently heavy, or weighted to overcome the resistance of friction to the descent of the piston, and instead of one or more pneumatic pumps being used, for the purpose of carrying the piston G, back to its starting point, and acting simply by the atmospheric pressure above, with a vacuum beneath the pistons, the pumps may be fitted with close covers, the pistons of which under these circumstances would be acted on by compressed air during their descent, or in lieu of the pneumatic pumps, powerful springs, whether of metal, india rubber, or other material, may if preferred be used. I prefer using the two small pneumatic pumps as described and shown in the drawings. On the seat of the pumps I place oil say 1 inch deep. It is better in my opinion for the pistons to strike that than the pump seats. This meter cylinder F, should be of rather more cubital capacity from the seat to the lower edge of the port, than the feed pump.

The construction of the counter, will be readily understood, from an inspection of Figs. 2, 3 and 4, in the drawings. Whatever length of stroke it is intended the distance from point to point on the outer circle shall represent, can readily be obtained by shifting the pin 9, up or down in the slot of the lever 8, when it is made fast by a nut, thereby varying the length of the lever, the ratchet wheel 2, having a pin in its center, to which it is made fast, working in a collar on the cross piece of the frame 1, gives motion to the wheel and pinion work, that work the hands on the face in the usual manner, working freely on the same center as the ratchet wheel. The lever 3, with an arm at its outer end, carries 1 or more small catches, if more than one, each a little longer than the other, the whole being attached to the arm by one pin. The catches are of steel, and are kept in contact with the teeth of the wheel, by means of the pin, which is seen on the left side of the arm, on which the curved part of the catches press, the same as seen at 6, Fig. 2, to prevent the return of the ratchet wheel during the back travel of the lever, catches, working freely on a pin in the frame 1, as seen at 6, Fig. 2, are placed so that the ends of the catches shall fall into the nearest tooth, preventing its return, and in order to render the stop catches more effective, the spring 7, which is a piece of steel or brass, curved or bent fastened to the frame 1, and cut or slit a portion of its length, into as many pieces, as there are catches, the end of each pressing against the catch opposite to it. The guard 10, crosses the lever 3, keeping the lever and catches steady. The lever 8, works on a pin at the center of the counter back, the pin 5, passing through the curved slot, is attached to the lever, by means of a nut. The lower end of the lever is pointed, and the distance between the index or points, being equal to an indicated full stroke on the counter face, it is a matter of convenience to have them marked, on the back, as shown in Fig. 4. It facilitates the adjustment of the length of lever, the length of stroke being determined, and lever adjusted to that, say 12 in., whatever distance within that the pin 9 moves, by the rise of the meter piston G, the pin 5 carrying with it the lever 3, catches 4, and ratchet wheel 2, will move forward in proportion, the stop catches allowing of the ratchet wheel being moved forward but being pressed by their own springs and the springs 7, into the tooth nearest their points, on the ratchet wheel casing to move forward, or on the back motion of the lever 8, it remains where it was carried to, the lever 8 returning to its starting point, and on the next forward motion, carrying it in proportion as before, it is deemed advisable to have 4 or 5 catches, differing in length slightly, and the same number of stop catches, to prevent any play or slip between the catches, and the tooth presented to their ends.

Having described the several parts, and the object or use of each, I will now describe its operation. The sectional elevation, Fig. 1, shown in the drawings, represents the feed pump plunger, R, in about the center of its downward stroke, forcing the fluid out of the feed pump, through the feed pipe into the cylinder F, beneath the piston G, which forces up the piston in the cylinder, thereby expelling an equal quantity of the fluid in the cylinder above the piston, out of the cylinder through the port, into, and through the chamber N, into the chest, O, the amount forced out being equal to the quantity forced into the cylinder during the downward stroke of the feed pump plunger. The fluid that is forced out, is supplied to the cylinder by the supply pipe D, from the hot well, during the exhaust stroke or descent of the piston G. When the feed pump plunger, has reached the end of its downward stroke, the piston G has reached the end of its upward stroke, provided the whole of the fluid forced out of the feed pump, by the plunger during its entire downward stroke has entered the cylinder F, beneath the piston G, but if only a portion of the fluid forced out of the feed pump during its downward stroke, has entered the cylinder, beneath the piston, by reason of the feed chest being full, or the feed shut off, the piston G, will only rise in proportion to the quantity that it actually receives, the remainder passing through the chest of the loaded valve, and escaping by the overflow, or waste pipe. If the full stroke of the piston G, be 12 inches, the pistons in the pneumatic pumps will be raised the same distance, if the piston G, make a full stroke, if it does not, their stroke will be the same as the pistons, and if the chest be full, so that it can contain no more fluid during the descent of the plunger R, or the feed being entirely shut off, so that the fluid forced out of the feed pump during the descent of the plunger, cannot enter the cylinder then the piston G, will not move, the fluid forced out of the feed pump finding an escape by raising the loaded valve, which as usual is loaded with a greater pressure per square inch of surface, than the force of the steam in the boilers. The pistons in the pneumatic pumps, when raised, leave a vacuum beneath. On the ascent of the feed pump plunger, the valve c instantly closes, preventing the return of any of the fluid into the cylinder, that has been forced past it. The valve, b, in the supply pipe D, at the same time opens, allowing the fluid to flow into the cylinder between the cover K, 1, and the upper side of the piston, from the hot well, during the descent or return of the piston to its starting point, which is accomplished partly by the fluid which has forced the piston up, rushing into the vacuity produced by the rise of the feed pump plunger, the pressure of the head or column of the fluid on the upper side of the piston, between it and the cover K, 1, and by the atmospheric pressure on the pistons in the pneumatic pumps, communicated to the piston by means of the cross head, and rods, if none of the fluid, that was forced out by the feed pump plunger, has escaped by the loaded valve, but has all entered the cylinder, and carried the piston up. The amount given to the cylinder during the feed pump plunger's descent, will be returned to the feed pump during the ascent of the plunger, by the return of the piston, the pressure on the piston during its descent, forcing the fluid beneath it back into the feed pump, at the same time by its superior pressure keeping the valve, a, closed, until it has returned all it received during the previous stroke, to the feed pump, thereby preventing any fluid entering the pump from the hot well, but if only a portion of the fluid discharged from the feed pump, during the descent of the plunger, has entered the cylinder, thereby only carrying the piston G, through a portion of its stroke, then the valve a, will open, when the fluid received by the cylinder from the feed pump during the previous downward stroke of the plunger, has been returned to the feed pump the deficiency is supplied to the feed pump, during the ascent of the plunger, the valve a, being instantly relieved of the pressure exerted on it during the descent of the piston G, opens, and the deficiency is supplied by the fluid flowing into the feed pump from the hot well, and if none of the fluid discharged from the feed pump during the descent of the plunger has entered the cylinder, but passes off by the loaded valve, and waste pipe, the chest O, being full, or the feed shut off, the piston G, not having moved, and there being none to return, the feed pump is filled on the ascent of the plunger from the wot well, by the pipe C. From this explanation of its operation, which I have endeavored to render as clear as possible, it will be seen that whatever amount of fluid may be forced out of the feed pump by the descent of the plunger only that which passes beyond the valve c, is registered by the counter.

What I claim as my invention, and desire to secure by Letters Patent, is—

1. The within described machine, or mechanical combination, for the measuring or ascertaining the cubical, or other quantity of a fluid, that may pass, or be forced by mechanical, or other means, through it, with the self registration of the same by means of a counter, or other suitable contrivance, arranged and operating substantially as described, but I do not intend by this specification to limit myself to the precise arrangement of parts herein described, intending to vary it in any manner, whereby results, substantially the same to those herein described are produced.

2. The making or leaving a sufficiency of space, above or beyond the port leading into the chamber N, in the cylinder F, to allow of the piston G, to pass above or beyond the port, or any portion of it, with the object or intent of providing an escape for the fluid, forced into the cylinder, from the feed pump, in case of the meter failing to act, from an accident, by breaking of the rods, or from other causes.

3. The use of the pneumatic pump, or pumps, or springs, whether of metal or other material, for the purpose of assisting the return of the piston G, during the exhaust or upward stroke of the feed pump plunger, substantially in the manner, and for the purpose herein described.

WILLIAM HENRY LINDSAY.

Witnesses:
WM. CUFF,
WILLIAM LINDSAY.